(12) United States Patent
Tamagawa et al.

(10) Patent No.: US 11,746,229 B2
(45) Date of Patent: Sep. 5, 2023

(54) RESIN COMPOSITION AND MOLDED BODY USING SAME

(71) Applicant: Konica Minolta, Inc., Tokyo (JP)

(72) Inventors: Minori Tamagawa, Ino (JP); Sho Osawa, Hino (JP); Tatsuya Hattori, Tokyo (JP)

(73) Assignee: Konica Minolta, Inc., Tokyo (JP)

(*) Notice: Subject to any disclaimer, the term of this patent is extended or adjusted under 35 U.S.C. 154(b) by 521 days.

(21) Appl. No.: 16/691,747

(22) Filed: Nov. 22, 2019

(65) Prior Publication Data
US 2020/0181401 A1 Jun. 11, 2020

(30) Foreign Application Priority Data
Dec. 6, 2018 (JP) ................................. 2018-228752

(51) Int. Cl.
| | |
|---|---|
| C08G 64/00 | (2006.01) |
| C08L 69/00 | (2006.01) |
| C08L 27/06 | (2006.01) |
| C08L 67/02 | (2006.01) |
| C08L 1/02 | (2006.01) |
| C08L 33/08 | (2006.01) |
| C08K 5/3465 | (2006.01) |
| C08K 5/46 | (2006.01) |
| B33Y 80/00 | (2015.01) |
| B33Y 70/00 | (2020.01) |

(52) U.S. Cl.
CPC ............ *C08L 69/00* (2013.01); *C08K 5/3465* (2013.01); *C08K 5/46* (2013.01); *C08L 1/02* (2013.01); *C08L 27/06* (2013.01); *C08L 33/08* (2013.01); *C08L 67/02* (2013.01); *B33Y 70/00* (2014.12); *B33Y 80/00* (2014.12); *C08L 2203/16* (2013.01); *C08L 2203/30* (2013.01)

(58) Field of Classification Search
USPC ................................. 528/196, 198, 271, 272
See application file for complete search history.

(56) References Cited

U.S. PATENT DOCUMENTS

| | | | |
|---|---|---|---|
| 2011/0046072 A1 | 2/2011 | Kanikanti et al. | |
| 2019/0090984 A1* | 3/2019 | Martz | .................... B33Y 70/00 |

FOREIGN PATENT DOCUMENTS

| | | | |
|---|---|---|---|
| CN | 101491494 A | 7/2009 | |
| CN | 101679682 A | 3/2010 | |
| JP | S61-077054 A | 4/1986 | |
| JP | 2002-265812 A | 9/2002 | |
| JP | 2003-105624 A | 4/2003 | |
| JP | 2003-519172 A | 6/2003 | |
| JP | 2007-326938 | 12/2007 | |
| JP | 2010-503565 A | 2/2010 | |
| JP | 2011-519878 A | 7/2011 | |
| JP | 2014-041340 A | 3/2014 | |
| JP | 2015-004044 | 1/2015 | |
| JP | 2016-206540 A | 12/2016 | |
| JP | 2018-189949 A | 11/2018 | |
| WO | WO 2001/049269 A1 | 7/2001 | |
| WO | WO 2008/033765 A2 | 3/2008 | |
| WO | WO 2015/019929 A1 | 2/2015 | |
| WO | WO 2015/022867 A1 | 2/2015 | |

OTHER PUBLICATIONS

Jackson et al., Antiplasticization. II. Characteristics of Antiplasticizers, J. Appl. Poly. Sci., vol. II, pp. 211-226 (1967).
Japanese Patent Application No. 2018-228752; Notice of Reasons for Refusal; dated Nov. 1, 2022; 10 pages.
Chinese Patent Application No. 201911213848.1; Office Action; dated Jul. 28, 2022; 12 pages.
China Patent Application Number; 201911213848.1; Office Action; dated Dec. 23, 2021; 13 pages.
Japanese Patent Application No. 2018-228752; Notice of Reasons for Refusal; dated Jun. 21, 2022; 12 pages.
China Patent Application No. 201911213848.1; Third Office Action; dated Nov. 30, 2022; 10 pages.

* cited by examiner

*Primary Examiner* — Terressa Boykin
(74) *Attorney, Agent, or Firm* — BakerHostetler

(57) ABSTRACT

Provided is a resin composition containing: a thermoplastic resin having a polar group; and a heterocyclic compound containing two or more heteroatoms, wherein the resin composition exhibits a different behavior in elastic strength with a glass transition temperature as a boundary.

16 Claims, No Drawings

RESIN COMPOSITION AND MOLDED BODY USING SAME

CROSS-REFERENCE TO RELATED APPLICATION

This application claims priority to Japanese Patent Application No. 2018-228752, filed Dec. 6, 2018, the entire disclosure of which is incorporated by reference.

TECHNICAL FIELD

The present invention relates to a resin composition and a molded body using the same. More specifically, the present invention relates to a resin composition that has an aptitude for general-purpose 3D printers, generates less gas during thermal molding, and excellent in at least strength or heat resistance when formed into a molded body, and the present invention relates to a molded body using the same.

BACKGROUND

When a polycarbonate, which is a thermoplastic resin, is molded by a 3D printer (also referred to as a three-dimensional printer), an FDM (fused deposition modeling) method is used. However, usually, the hot melt molding temperature of polycarbonate is 300 to 320° C. Therefore, although it may be used for some high-end 3D printers, it is not possible to use for general-purpose 3D printers having a heat-resistant temperature of 250 to 270° C.

In order to lower the hot melt molding temperature, there are generally known methods such as lowering the viscosity by lowering the molecular weight or adding a plasticizer. However, in these cases, there is a problem that mechanical properties after molding, for example, elastic modulus is lowered.

Therefore, it is known an anti-plasticizer as an additive that works as a plasticizer when melted, and after solidification, the elastic modulus is improved or maintained. Refer to Non-Patent Document 1 (Journal of Applied Polymer Science, Vol. 11, pp. 211-226 (1967)) and Patent Document 1 (JP-A 2007-326938), for example. Using an anti-plasticizer may lower the glass transition temperature and lower the hot melt molding temperature, but unlike plasticizers, it does not soften when solidified.

However, in Non-Patent Document 1 and Patent Document 1, both were performed by a solution molding method (a method in which a film is formed with a raw material dissolved in a solvent and then dried to be molded). Further, according to Patent Document 2 (Japanese Registered Patent 6,147,595), some anti-plasticizers have a problem that a large amount of gas is generated at the time of thermal molding, the performance after high-temperature treatment is deteriorated, and foreign matters are generated in the molded body. In addition, some of the anti-plasticizers still have insufficient mechanical properties when formed into molded bodies. That is, both strength and heat resistance as a molded body are insufficient in the prior art, and there is a need for a resin composition in which at least one of them is improved.

SUMMARY

The present invention has been made in view of the above problems and circumstances. An object of the present invention is to provide a resin composition that has an aptitude for general-purpose 3D printers, generates less gas during thermal molding, and excellent in at least strength or heat resistance when formed into a molded body, and to provide a molded body using the same.

To achieve at least one of the above-mentioned objects according to the present invention, a resin composition reflecting an aspect of the present invention is a resin composition comprising: a thermoplastic resin having a polar group; and a heterocyclic compound containing two or more heteroatoms, wherein the resin composition exhibits a different behavior in elastic strength with a glass transition temperature as a boundary.

DETAILED DESCRIPTION OF THE EMBODIMENTS

Hereinafter, one or more embodiments of the present invention will be described. However, the scope of the invention is not limited to the disclosed embodiments.

The resin composition of the present invention comprises: a thermoplastic resin having a polar group; and a heterocyclic compound having two or more heteroatoms, wherein the resin composition exhibits a different behavior in elastic strength with a glass transition temperature as a boundary. This feature is a technical feature common to or corresponding to each of the following embodiments.

By the above embodiment of the present invention, it is possible to provide a resin composition and a molded body having an aptitude for general-purpose 3D printers, generating less gas during thermal molding, and excellent in at least strength or heat resistance when formed into a molded body.

The expression mechanism or action mechanism of the effect of the present invention is not clear, but it is presumed as follows.

(1) Thermal Moldability (Aptitude for General-Purpose 3D Printers)

At high temperatures, the molecular motion of the resin and the compound becomes active. When the compound enters between the resin chains, the interaction between the resins becomes smaller and the motion becomes larger than when only the resin is used, so that the softening and thermal moldability are enhanced even at a relatively low temperature. Therefore, it is supposed that the resin composition of the present invention may be easily molded even with a general-purpose 3D printer having a low temperature during thermal molding by using a thermoplastic resin and a heterocyclic compound.

(2) Elastic Modulus (Strength)

Factors contributing to the elastic modulus include polymer crystallization, interaction between polar groups (for resins having polar groups), filling of free volume, rigidity of the compound itself, and planarity of the compound itself. In particular, in the case of the present invention, the degree of influence on the elastic modulus is considered to be highly attributable to both the interaction between the polar groups of the thermoplastic resin and the heterocyclic compound and the rigidity of the thermoplastic resin and the heterocyclic compound themselves.

When the heteroatoms in the heterocyclic compound are at the para position to each other, the distance of the polarities becomes large. As a result, it is easy to make interaction between the heterocyclic compound and the thermoplastic resin. In addition, since the molecules are difficult to move due to the condensed ring structure, it is presumed that the resistance force increases when the force is applied, and the elastic modulus increases.

(3) Heat Resistance

The higher the molecular weight of the heterocyclic compound, the harder the decomposition of the compound itself.

Moreover, it is assumed that since the heterocyclic compound has polarity, the interaction with the polar group of the thermoplastic resin becomes strong. As a result, it is difficult to volatilize at high temperatures, and generation of gas during molding is suppressed.

In the present invention, "a different behavior in elastic strength with a glass transition temperature as a boundary" means a phenomenon that the elastic modulus is increased at a temperature lower than the glass transition temperature of the resin composition, and the viscoelasticity and the melting temperature are reduced at a temperature higher than the glass transition temperature.

As an embodiment of the present invention, from the viewpoint of manifesting the effect of the present invention, it is preferable that the heterocyclic compound is a condensed ring compound having two or more rings, and that one of a nitrogen atom (N), an oxygen atom (O) and a sulfur atom (S) is contained at para positions to each other in a skeleton of at least one ring of the condensed ring.

The polar group possessed by the thermoplastic resin is preferably any one of a halogen atom, a carboxy group, a hydroxy group, an alkoxy group, an alkoxycarbonyl group, an aryloxycarbonyl group, an amino group, an amide group, and a cyano group.

Further, it is preferable that the heterocyclic compound contains at least one of a quinoxaline structure, a praziquantel structure, and a mequitazine structure, from the viewpoint of high rigidity and improving the elastic modulus.

It is preferable that the molecular weight of the heterocyclic compound exceeds 183 from the viewpoint of suppressing thermal decomposition of the compound itself.

The thermoplastic resin of the present invention is preferably a thermoplastic resin having a polar group such as an aromatic polycarbonate, a cycloolefin, a polyester, a cellulose ester or an acrylic resin from the viewpoint of improving moldability and elastic modulus.

The added amount of the heterocyclic compound is preferably in the range of 1 to 20 mass % with respect to the thermoplastic resin from the viewpoint of controlling moldability and elastic modulus.

Although the molded body using the resin composition of the present invention is suitable for various uses, in particular, it is preferable to be provided in an electrical and electronic device, a vehicle-mounted member, or a medical instrument.

The present invention and the constitution elements thereof, as well as configurations and embodiments, will be detailed in the following. In the present description, when two figures are used to indicate a range of value before and after "to", these figures are included in the range as a lowest limit value and an upper limit value.

Outline of the Resin Composition

The resin composition of the present invention is a resin composition containing a thermoplastic resin having a polar group and a heterocyclic compound containing two or more heteroatoms, wherein the resin composition exhibits a behavior having a different elastic strength with a glass transition temperature as a boundary.

The thermoplastic resin according to the present invention has a property of softening when it reaches the glass transition temperature or the melting point, and has a polar group in the structure. The resin composition of the present invention contains a thermoplastic resin and a heterocyclic compound described later, and is suitably used as materials for a 3D printer using an FDM (fused deposition modeling) method.

Hereinafter, the constituent elements of the present invention will be described in detail.

Thermoplastic Resin

The thermoplastic resin according to the present invention contains a polar group, and it is preferably an aromatic polycarbonate, a cycloolefin, polyethylene terephthalate, a cellulose ester or an acrylic resin.

The polar group used in the present invention is preferably any one of a halogen atom, a carboxy group, a hydroxy group, an alkoxy group, an alkoxycarbonyl group, an aryloxycarbonyl group, an amino group, an amide group, and a cyano group.

Aromatic Polycarbonate

In the present invention, various known polycarbonate resins may also be used. In the present invention, it is particularly preferable to use an aromatic polycarbonate. There is no limitation in particular to the aromatic polycarbonate, and there will be no limitation in particular if it is an aromatic polycarbonate from which the various desired characteristics of the resin composition are acquired.

In general, a polymer material generically called polycarbonate is a generic term for a material in which a polycondensation reaction is used in the synthesis method and the main chain is linked by a carbonate bond. Of these, in general, it means a product obtained by polycondensation using a phenol derivative, phosgene, and a diphenyl carbonate. Usually, an aromatic polycarbonate represented by a repeating unit having 2,2-bis(4-hydroxyphenyl)propane called bisphenol-A as a bisphenol component is preferably selected. An aromatic polycarbonate copolymer may be constituted by appropriately selecting various bisphenol derivatives.

In addition to this bisphenol-A as a copolymerization component, the following compounds may be used: bis(4-hydroxyphenyl)methane, 1,1-bis(4-hydroxyphenyl)cyclohexane, 9,9-bis(4-hydroxyphenyl)fluorene, 1,1-bis(4-hydroxyphenyl)-3,3,5-trimethylcyclohexane, 2,2-bis(4-hydroxy-3-methylphenyl)propane, 2,2-bis(4-hydroxyphenyl)-2-phenylethane, 2,2-bis(4-hydroxyphenyl)-1,1,1,3,3,3-hexafluoropropane, bis(4-hydroxyphenyl)diphenylmethane, bis(4-hydroxyphenyl)sulfide, bis(4-hydroxyphenyl)sulfone, and 1,1-bis(4-hydroxyphenyl)-3,3,5-trimethylcyclohexane.

It is also possible to use an aromatic polyester carbonate partially containing terephthalic acid and/or isophthalic acid components. By using such a structural unit as a part of the constituent component of the aromatic polycarbonate composed of bisphenol-A, the properties of the aromatic polycarbonate such as heat resistance and solubility may be improved. The present invention is also effective for such a copolymer.

When the aromatic polycarbonate used here has a viscosity average molecular weight of 10,000 or more and 200,000 or less, it is suitably used. A viscosity average molecular weight of 20,000 to 120,000 is particularly preferred. When a resin having a viscosity average molecular weight lower than 10,000 is used, the mechanical strength of the resulting film may be insufficient, and when the molecular weight exceeds 200,000, the viscosity of the dope becomes too high, which causes a problem in handling. The viscosity average molecular weight may be measured by commercially available high-performance liquid chromatography.

The glass transition temperature of the aromatic polycarbonate used in the present invention is preferably 200° C. or higher in order to obtain a highly heat-resistant film, and more preferably 230° C. or higher. These may be obtained by appropriately selecting the copolymerization component. The glass transition temperature may be measured with a DSC device (differential scanning calorimeter). For example, it is a temperature at which the baseline starts to be deviated, which is obtained according to a temperature rising condition of 10° C./min by RDC220 manufactured by Seiko Instruments Inc.

As the aromatic polycarbonate, one synthesized by a known method may be used, or a commercially available product may be used. Examples of the commercially available product include Panlite™ L-1225Y, Iupilon™ S-3000, and Iupilon™ H-4000 (all manufactured by Teijin Limited). The production method of the polycarbonate resin is not particularly limited, and a known method may be adopted. For example, a method of directly reacting phosgene with an aromatic dihydric phenol compound (interfacial polymerization method), or a method of transesterifying an aromatic dihydric phenol compound and a diester carbonate such as diphenyl carbonate in a molten state (solution method) may be cited.

Cyclic Olefin Having an Ester Group

In the present invention, it is preferable to use a cycloolefin. Hereinafter, a cycloolefin will be described as a "cycloolefin-based polymer".

The cycloolefin-based polymer is a polymer of a cycloolefin-based monomer containing a cycloolefin-based monomer having a polar group, or a copolymer of the cycloolefin monomer and another copolymerizable monomer.

The cycloolefin-based monomer constituting the cycloolefin-based polymer is preferably a norbornene-based monomer.

The norbornene-based monomer having a polar group is preferably a norbornene-based monomer represented by the following Formula (A).

Formula (A)

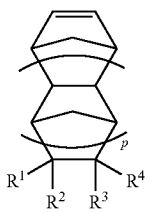

$R^1$ to $R^4$ in Formula (A) each independently represent a hydrogen atom, a halogen atom, a hydrocarbon group having 1 to 5 carbon atoms, or a polar group. However, at least one of $R^1$ to $R^4$ represents a polar group.

Examples of the halogen atom include a fluorine atom and a chlorine atom. Examples of the hydrocarbon group having 1 to 5 carbon atoms include a methyl group, an ethyl group, a propyl group, and a butyl group. The hydrocarbon group having 1 to 5 carbon atoms may further include a linking group containing a halogen atom, an oxygen atom, a nitrogen atom, a sulfur atom, or a silicon atom. Examples thereof are a divalent linking group such as a carbonyl group, an imino group, an ether bond, a silyl ether bond, and a thioether bond.

$R^2$ and $R^3$ may be bonded to each other to form an aromatic ring or an aliphatic ring.

At least one of $R^1$ to $R^4$ is a polar group, and the polar group has the same meaning as the polar group described above.

Further, among $R^1$ to $R^4$, $R^1$ and $R^2$ may be a hydrogen atom at the same time, or $R^1$, $R^2$ and $R^3$ may be a hydrogen atom at the same time. Such a norbornene-based monomer has a low molecular symmetry because the substituent is substituted with one-side carbon, and may promote diffusion movement between the resin and the additive during solvent volatilization in the film forming process.

In Formula (A), p represents an integer of 0 to 2. From the viewpoint of improving the heat resistance of the optical film, p is preferably 1 to 2. This because when p is 1 to 2, the resulting resin becomes bulky and the glass transition temperature is easily improved.

Specific examples of the norbornene-based monomer represented by Formula (A) are indicated below. Among these, examples of the norbornene-based monomer having a polar group include the following compounds.

1

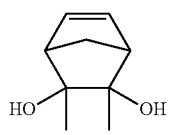

2

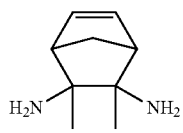

3

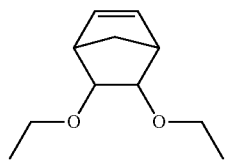

4

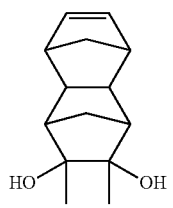

5

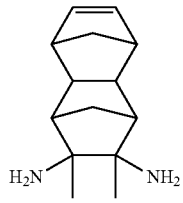

6

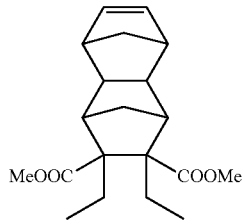

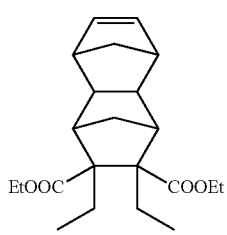
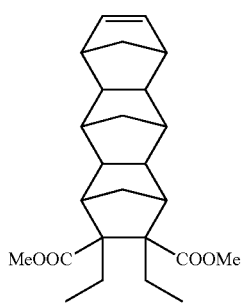
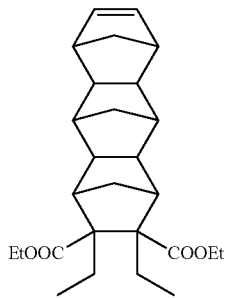
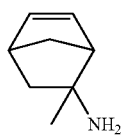
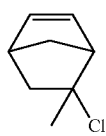
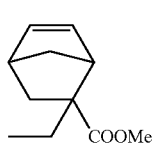
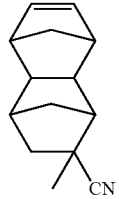
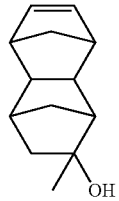
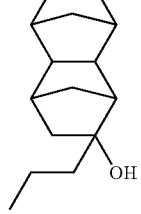
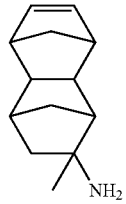
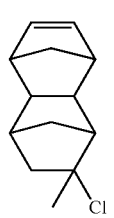
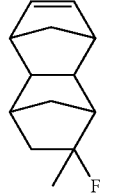

22 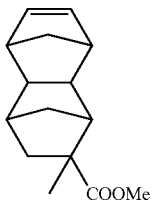
COOMe

23 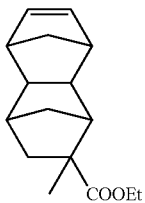
COOEt

24 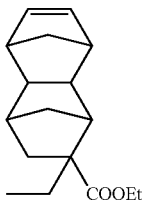
COOEt

25 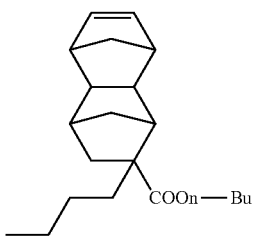
COOn—Bu

26 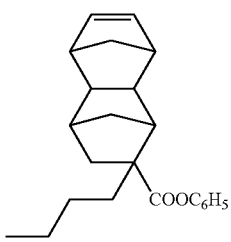
COOC₆H₅

27 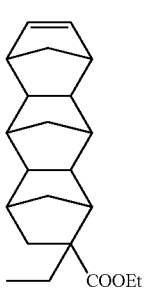
COOEt

28 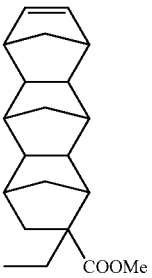
COOMe

29 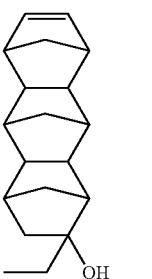
OH

The norbornene-based monomer constituting the cycloolefin-based polymer may further include not only a norbornene-based monomer having a polar group but also a norbornene monomer having no polar group.

The norbornene-based monomer having no polar group may be, for example, a monomer in which $R^1$ to $R^4$ in Formula (A) are each independently a hydrogen atom, a halogen atom, a silyl group, or a hydrocarbon group having 1 to 5 carbon atoms.

The content ratio of the structural unit derived from the norbornene-based monomer having a polar group is, for example, 50 mol % or more, preferably 70 mol % or more, and more preferably 100 mol % based on the total of structural units derived from the norbornene-based monomer constituting the cycloolefin-based polymer. When the structural unit derived from a norbornene-based monomer having a polar group is included in a certain amount or more, the polarity of the resin is easily increased, and the cycloolefin-based polymer may be easily dissolved in the solvent. Therefore, it becomes easy to prepare the resin composition according to the present invention.

Examples of the copolymerizable monomer that may be copolymerized with norbornene-based monomers include copolymerizable monomers capable of ring-opening copolymerization with norbornene-based monomers, and copolymerizable monomers capable of addition copolymerization with norbornene-based monomers.

Examples of the copolymerizable monomer capable of ring-opening copolymerization with norbornene-based monomers include cycloolefins other than norbornene-based monomers such as cyclobutene, cyclopentene, cycloheptene, cyclooctene and dicyclopentadiene.

Examples of the copolymerizable monomer capable of addition copolymerization with norbornene-based monomers include an unsaturated double bond-containing compound, a vinyl cyclic hydrocarbon monomer, and (meth) acrylate. Examples of the unsaturated double bond-containing compound are olefinic compounds having 2 to 12 (preferably 2 to 8) carbon atoms. Examples thereof include ethylene, propylene, and butene. Examples of the vinyl cyclic hydrocarbon monomer include vinylcyclopentene monomers such as 4-vinylcyclopentene and 2-methyl-4- isopropenylcyclopentene. Examped of the (meth)acrylate include alkyl (meth) acrylates having 1 to 20 carbon atoms such as methyl (meth)acrylate, 2-ethylhexyl (meth)acrylate and cyclohexyl (meth)acrylate.

The content of the structural unit derived from the norbornene-based monomer is 50 to 100 mol %, preferably 60 to 100 mol %, more preferably 70 to 100 mol %, based on the total of the structural units constituting the cycloolefin polymer.

As described above, the cycloolefin polymer is a polymer obtained by polymerizing or copolymerizing a norbornene-based monomer including a norbornene-based monomer having a polar group. The polymerization or copolymerization may be ring-opening polymerization or ring-opening copolymerization, or may be addition polymerization or addition copolymerization. Examples of the polymer include the following.

(1) Ring-opening polymer of norbornene-based monomer (2) Ring-opening copolymer of norbornene-base monomer and copolymerizable monomer capable of ring-opening copolymerization with it (3) Hydrogenated product of the ring-opening (co)polymer of (1) or (2) above (4) (Co)polymer prepared by cyclization of the ring-opening (co)polymer of (1) or (2) above with the Friedel-Crafts reaction and then hydrogenated.

(5) Addition copolymer of norbornene-based monomer and unsaturated double bond-containing compound (6) Addition copolymer of norbornene-based monomer and vinyl cyclic hydrocarbon monomer, and its hydrogenated product (7) Addition copolymer of norbornene-based monomer and (meth)acrylate Any of the polymers (1) to (7) may be obtained by known methods, for example, the methods described in JP-A 2008-107534 and JP-A 2005-227606. For example, as the catalyst and solvent used in the ring-opening copolymerization (2), those described in paragraphs [0019] to [0024] of JP-A 2008-107534 may be used. As the catalyst used for hydrogenation in (3) and (6), those described in paragraphs [0025] to [0028] of JP-A 2008-107534 may be used. As the acidic compound used in the Friedel-Crafts reaction of (4), those described in paragraph [0029] of JP-A 2008-107534 may be used. As the catalyst used in the addition polymerization of (5) to (7), for example, the compounds described in paragraphs [0058] to [0063] of JP-A 2005-227606 may be used. The alternating copolymerization reaction (7) may be performed by the method described in paragraphs [0071] and [0072] of JP-A 2005-227606.

Of these, (1) to (3) and (5) are preferable, and (1) to (3) are more preferable. That is, the cycloolefin polymer is preferably a ring-opening polymer or a ring-opening copolymer of norbornene-based monomers or a hydrogenated product thereof. Such a cycloolefin polymer may contain a structural unit represented by the following Formula (B). The structural unit represented by Formula (B) is derived from the ring-opened product of the norbornene-based monomer represented by Formula (A).

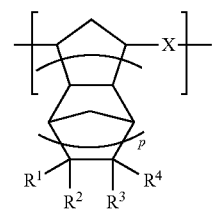

Formula (B)

X in Formula (B) represents —CH=CH— or —CH$_2$CH$_2$—.

R$^1$ to R$^4$ and p in Formula (B) have the same meanings as R$^1$ to R$^4$ and p in Formula (A), respectively.

A commercially available product may be used as a cycloolefin-based polymer. Examples of the commercially available cycloolefin polymer include Arton™ G (for example, G7810), Arton™ F, Arton™ R (for example, R4500, R4900, and R5000), and Arton™ RX (manufactured by JSR Corporation).

The weight average molecular weight (Mw) of the cycloolefin-based polymer is preferably 20,000 to 300,000. When the weight average molecular weight is in the above range, the heat resistance, water resistance, chemical resistance and mechanical properties of the cycloolefin polymer are improved. The weight average molecular weight (Mw) of the cycloolefin polymer is more preferably 30,000 to 250,000, and further preferably 40,000 to 200,000. The weight average molecular weight of the cycloolefin polymer may be measured in terms of polystyrene by gel permeation chromatography (GPC).

The glass transition temperature (Tg) of the cycloolefin-based polymer is usually 110° C. or higher, preferably it is 110 to 350° C., more preferably 120 to 250° C., and further more preferably 120 to 220° C. When Tg is 110° C. or higher, it is easy to suppress deformation under high temperature conditions. On the other hand, when Tg is 350° C. or lower, the molding process is facilitated, and the deterioration of the resin due to the heat during the molding process is easily suppressed.

Polyester

The polyester according to the present invention is a polycondensation substance of a polyvalent carboxylic acid and a polyalcohol, and is a general term for polycondensation substance having an ester bond (—CO—O—) in the repeating unit of the main chain.

Polyester may be obtained by condensing any dicarboxylic acid and diol. Examples of the dicarboxylic acid include: terephthalic acid, isophthalic acid, orthophthalic acid, 2,5-naphthalenedicarboxylic acid, 2,6-naphthalenedicarboxylic acid, 1,4-naphthalenedicarboxylic acid, 1,5-naphthalenedicarboxylic acid, diphenylcarboxylic acid, diphenoxyethanedicarboxylic acid, diphenylsulfonecarboxylic acid, anthracene dicarboxylic acid, 1,3-cyclopentanedicarboxylic acid, 1,3-cyclohexanedicarboxylic acid, 1,4-cyclohexanedicarboxylic acid, hexahydroterephthalic acid, hexahydroisophthalic acid, malonic acid, dimethylmalonic acid, succinic acid, 3,3-diethylsuccinic acid, glutaric acid, 2,2-dimethylglutaric acid, adipic acid, 2-methyladipic acid, trimethyladipic acid, pimelic acid, azelaic acid, dimer acid, sebacic acid, suberic acid, and dodecadicarboxylic acid.

Examples of the diol include: ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexnediol, 2,2-bis(4-hydroxyphenyl)propane, and bis(4-hydroxyphenyl)sulfone.

As the dicarboxylic acid component and the diol component constituting the polyester, one or more of each may be used.

Examples of the polyester include polyethylene terephthalate (PET), polyethylene naphthalate (PEN), polypropylene terephthalate, and polybutylene terephthalate. Polyethylene terephthalate (PET) is preferably used for the resin composition of the present invention. The polyester may contain other copolymerization components as required. From the viewpoint of mechanical strength, the proportion of the copolymerization component is preferably 3 mol % or less, more preferably 2 mol % or less, still more preferably 1.5 mol % or less. These resins are excellent in transparency, heat resistance and mechanical properties.

Cellulose Ester

The cellulose ester that may be used in the present invention is preferably at least one selected from cellulose (di and tri) acetate, cellulose propionate, cellulose butyrate, cellulose acetate propionate, cellulose acetate butyrate, cellulose acetate phthalate, and cellulose phthalate.

Among these, particularly preferable cellulose esters include cellulose triacetate, cellulose propionate, cellulose butyrate, cellulose acetate propionate, and cellulose acetate butyrate.

As the substitution degree of the mixed fatty acid ester, when an acyl group having 2 to 4 carbon atoms is used as a substituent, a cellulose ester that simultaneously satisfies the following expressions (I) and (II) is preferred when the substitution degree of the acetyl group is X, and the substitution degree of the propionyl group or butyryl group is Y.

$$2.0 \leq X+Y \leq 3.0 \quad \text{Expression (I):}$$

$$0 \leq X \leq 2.5 \quad \text{Expression (II):}$$

Further, the cellulose ester used in the present invention preferably has a ratio of Mw/Mn in the range of 1.5 to 5.5, here, Mw is a weight average molecular weight and Mn is a number average molecular weight. A particularly preferred cellulose ester has a ratio of Mw/Mn in the range of 2.0 to 5.0, more preferred is 2.5 to 5.0, and still more preferred is 3.0 to 5.0.

The number average molecular weight of the cellulose ester used in the present invention is preferably in the range of 60,000 to 300,000, more preferably 70,000 to 200,000, from the viewpoints of melt viscosity and mechanical strength.

The cellulose ester used in the present invention preferably has a ratio of weight average molecular weight (Mw)/number average molecular weight (Mn) in the range of 1.4 to 3.0, more preferably 1.4 to 2.2. By setting the ratio of Mw/Mn within this range, the elastic modulus of the cellulose ester-containing composition is likely to increase. It is considered that the smaller the ratio of Mw/Mn, the smaller the molecular weight distribution, so that the polymer molecules are easily oriented and a homogeneous molded body with few voids is likely to be formed.

The average molecular weight and molecular weight distribution of the cellulose ester may be measured by a known method using high performance liquid chromatography. Using these, the number average molecular weight and the weight average molecular weight may be calculated, and the ratio (Mw/Mn) may be calculated.

The measurement conditions of the number average molecular weight and the weight average molecular weight using high-performance liquid chromatography are as follows:

Solvent: Methylene chloride
Column: Shodex K806, K805, K803G (used by connecting three columns, manufactured by Showa Denko K.K.)
Sample concentration: 0.1 mass %
Detector: RI Model 504 (manufactured by GL Sciences Inc.)
Pump: L6000 (manufactured by Hitachi, Ltd.)
Flow rate: 1.0 ml/min
Calibration curve: STK standard polystyrene (manufactured by Tosoh Corporation). A calibration curve obtained by using 13 samples (Mw=1,000,000 to 500) was used. It is preferable to obtain 13 samples at approximately equal intervals.

The raw material cellulose used for cellulose ester in the present invention may be wood pulp or cotton linter. The wood pulp may be coniferous or hardwood, but coniferous is more preferred. A cotton linter is preferably used from the viewpoint of peelability during film formation. The cellulose ester made from these may be mixed suitably or may be used independently.

For example, the ratio of cotton linter-derived cellulose ester: wood pulp (coniferous)-derived cellulose ester: wood pulp (hardwood)-derived cellulose ester may be as follows: 100:0:0, 90:10:0, 85:15:0, 50:50:0, 20:80:0, 10:90:0, 0:100:0, 0:0:100, 80:10:10, 85:0:15, and 40:30:30.

In the present invention, the pH of the cellulose ester is preferably 6 to 7, and the electrical conductivity is preferably 1 to 100 S/cm measured with a solution obtained by adding 1 g of cellulose ester to 20 mL of pure water (electric conductivity 0.1 S/cm or less, pH 6.8), then stirred in a nitrogen atmosphere at 25° C. for 1 hr.

Acrylic Resin

The acrylic resin that may be used in the present invention includes a methacrylic resin. The resin is not particularly limited, but a resin comprising 50 to 99 mass % of methyl methacrylate units and 1 to 50 mass % of other monomer units copolymerizable therewith is preferable.

Examples of the other monomer copolymerizable therewith include: α,β-unsaturated acids such as alkyl methacrylates having 2 to 18 alkyl carbon atoms, alkyl acrylates having 1 to 18 carbon atoms, acrylic acid, and methacrylic acid; unsaturated divalent carboxylic acids such as maleic acid, fumaric acid, and itaconic acid; aromatic vinyl compounds such as styrene, α-methylstyrene, and substituted styrene; α,β-unsaturated nitriles such as acrylonitrile and methacrylonitrile; maleic anhydride, maleimide, N-substituted maleimide, and glutaric anhydride.

Among these, methyl acrylate, ethyl acrylate, n-propyl acrylate, n-butyl acrylate, s-butyl acrylate, and 2-ethylhexyl acrylate are preferable, and methyl acrylate and n-butyl acrylate are particularly preferably used.

A commercially available product may also be used as an acrylic resin. Examples thereof include: DELPET™ 60N, 80N (manufactured by Asahi Kasei Chemicals Co., Ltd.), DIANAL™ BR52, BR80, BR83, BR85, BR88 (manufactured by Mitsubishi Rayon Co., Ltd.), and KT75 (manufactured by Denki Kagaku Kogyo Co., Ltd.).

Heterocyclic Compound

The resin composition of the present invention contains a thermoplastic resin having a polar group and a heterocyclic compound containing two or more heteroatoms.

Further, it is preferable that the heterocyclic compound is a condensed ring compound having two or more rings, and that one of a nitrogen atom (N), an oxygen atom (O), and a sulfur atom (S) is contained at para positions to each other in a skeleton of at least one ring.

The heterocyclic compound is preferably a polycyclic aromatic heterocyclic compound, but in that case, there is no restriction on the ring condensation mode, any rings that constitute the condensed polycyclic structure may be condensed in any condensed manner. The rings that constitute the polycyclic aromatic heterocyclic compound are an aromatic heterocyclic ring and, when required, an aromatic hydrocarbon ring. The number of aromatic heterocycles contained in the polycyclic aromatic heterocyclic compound may be at least one, and all the rings may be aromatic heterocycles. As described above, the heteroatom is preferably any one of a nitrogen atom (N), an oxygen atom (O), and a sulfur atom (S).

Examples of the polycyclic aromatic heterocyclic group include: a quinoline ring group, an isoquinoline ring group, a benzoquinoline ring group, a benzoisoquinoline ring group, a quinazoline ring group, a phthalazine ring group, a pteridine ring group, a coumarin ring group, a chromone ring group, a 1,4-benzodiazepine ring group, an indole ring group, a benzimidazole ring group, a benzotriazole ring group, a benzofuran ring group, a purine ring group, an acridine ring group, a phenoxazine ring group, a phenothiazine ring group, a benzothiadiazole ring group, a benzooxadiazole ring group, an isobenzofuran ring group, an isoindole ring group, a benzo[b]thiophene ring group, a benzo[c]thiophene ring group, a benzodithiophene group, a benzotrithiophene group, a dibenzothiophene ring group, a thienothiophene group, a benzothienobenzothiophene group, a dithienothiophene group, a dinaphthothienothiophene group, a dianthrathienothiophene group, a cyclopentadithiophene group, a benzophosphore ring group, an indazole ring group, a benzoxazole ring group, a benzoisoxazole ring group, a benzothiazole ring group, benzoisothiazole ring group, a quinoxaline ring group, a cinnoline ring group, a 1,4-benzodioxane group, a xanthine group, a pyrazolopyridine group, a praziquantel group, a carbazole ring group, a phenanthridine ring group, a phenanthroline ring group, a phenazine ring group, perimidine ring group, a xanthene ring group, a benzofuran ring group, a dibenzofuran ring group, a benzopyran group, indazole group, a naphthyridine group, a dithienosilole group, a benzodiselenophene group, and a benzotrifuran group.

Among these, the heterocyclic compound preferably has a quinoxaline structure, a praziquantel structure, or a mequitazine structure from the viewpoint of high rigidity of the compound itself and an improvement in elastic modulus.

Further, the heterocyclic compound according to the present invention may have a substituent. Examples of the substituent include: alkyl groups such as a methyl group, an ethyl group, a propionyl group, and a tertiary butyl group; an aryl group, a heterocyclic group; alkoxy groups such as a methoxy group, an ethoxy group, and a propoxy group; an aryloxyl group such as a phenoxy group; a thioether group, a polyethyleneoxy group; aromatic hydrocarbon groups such as a phenyl group and a biphenyl group; amino groups such as a dimethylamino group, a diethylamino group, a dibenzylamino group, a diphenylamino group, and a ditolylamino group; a cyano group, and a quinuclidine group.

The molecular weight of the above described compound is preferably more than 183 from the viewpoint of suppressing thermal decomposition of the compound itself. More preferably, it is 270 or more, and still more preferably in the range of 300 to 400.

Specific compounds include the following compounds, but the present invention is not limited to the following compounds.

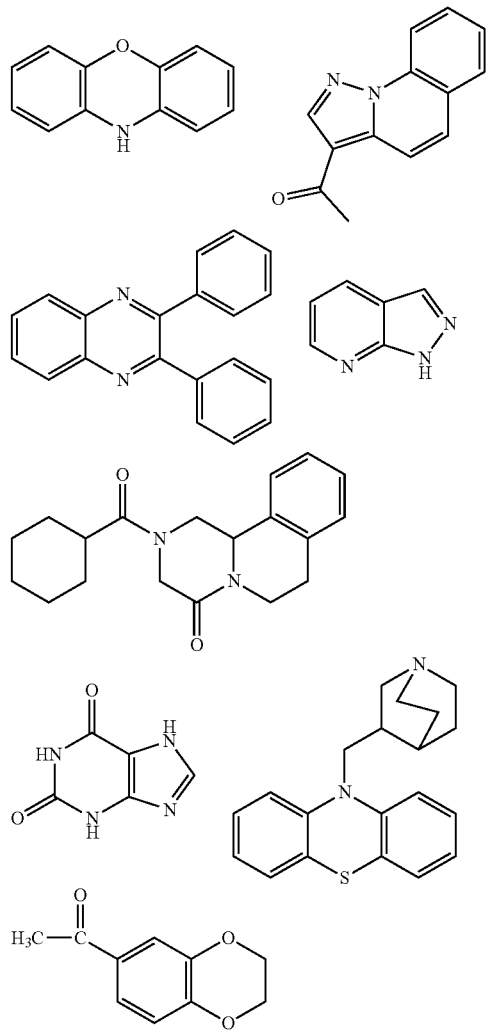

Any of these exemplified compounds may be synthesized by appropriately adopting known synthetic methods.

From the viewpoint of obtaining the effects of the present invention, the compound having a polar group according to the present invention is preferably contained in an amount of 1 mass % or more based on the thermoplastic resin. The upper limit of the content is preferably in the range of 20 mass % from the viewpoint of strength when formed into a molded body.

In addition, as a method for searching for the compound of the present invention, a method called materials informatics using computational science and information science may also be used.

Other Additives

Examples of various resin additives include: heat stabilizers, antioxidants, release agents, UV absorbers, dyes and pigments, flame retardants, antistatic agents, antifogging agents, lubricants and antiblocking agents, fluidity improvers, plasticizers, dispersants, and antifungal agents. Two or more of these may be used in combination. Hereinafter, an example of an additive suitable for the resin composition of the present invention will be specifically described.

Examples of the heat stabilizer include phosphorus compounds. As the phosphorus compound, any conventionally known compound may be used. Specific examples thereof include: phosphoric acid, phosphonic acid, phosphorous acid, phosphinic acid, phosphorus oxoacids such as polyphosphoric acid, acidic pyrophosphate metal salts such as acidic sodium pyrophosphate, acidic potassium pyrophosphate, and acidic calcium pyrophosphate, Group 1 or Group 2B metal phosphates such as potassium phosphate, sodium phosphate, cesium phosphate, and zinc phosphate, organic phosphate compounds, organic phosphite compounds, and organic phosphonite compounds. The content of the phosphorus compound is usually 0.001 to 1 mass parts, preferably 0.01 to 0.7 mass parts, and more preferably 0.03 to 0.5 mass parts with respect to 100 mass parts of the total of the thermoplastic resin and the compound according to the present invention.

Examples of the antioxidant include hindered phenol antioxidants. Among them, pentaerythritol tetrakis[3-(3,5-di-tert-butyl-4-hydroxyphenyl)propionate] and octadecyl-3-(3,5-di-tert-butyl-4-hydroxyphenyl)propionate are preferably used. These are commercially available from BASF Japan under the names "Irganox™ 1010" and "Irganox™ 1076". The content of the antioxidant is usually 0.001 to 1 mass parts, preferably 0.01 to 0.5 mass parts with respect to 100 mass parts of the total of the thermoplastic resin and the compound according to the present invention.

The release agent includes at least one compound selected from the group consisting of aliphatic carboxylic acids, esters of aliphatic carboxylic acids and alcohols, aliphatic hydrocarbon compounds having a number average molecular weight of 200 to 15000, and polysiloxane silicone oils. The content of the release agent is usually 0.001 to 2 mass parts, preferably 0.01 to 1 mass part with respect to 100 mass parts of the total of the thermoplastic resin and the compound according to the present invention.

Specific examples of the UV absorber include: inorganic UV absorbers such as cerium oxide and zinc oxide; and organic UV absorbers such as benzotriazole compounds, benzophenone compounds, and triazine compounds. Of these, organic UV absorbers are preferred. A particularly preferable organic UV absorber is one selected from the group consisting of a benzotriazole compound, 2-(4,6-diphenyl-1,3,5-triazin-2-yl)-5-[(hexyl)oxy]-phenol, 2-[4,6-bis (2,4-Dimethylphenyl)-1,3,5-triazin-2-yl]-5-(octyloxy)phenol, 2,2'-(1,4-phenylene)bis[4H-3,1-benzoxazin-4-one], and [(4-Methoxyphenyl)-methylene]-propanedioic acid-dimethyl ester. The content of the UV absorber is usually 0.01 to 3 mass parts, preferably 0.1 to 1 mass parts with respect to 100 mass parts of the total of the thermoplastic resin and the compound according to the present invention.

Examples of the dye and pigment include inorganic pigments, organic pigments, and organic dyes. Examples of the inorganic pigment include: carbon black, sulfide pigments such as cadmium red and cadmium yellow; silicate pigments such as ultramarine blue; oxide pigments such as titanium oxide, zinc oxide, red ocher, chromium oxide, iron black, titanium yellow, zinc-iron brown, titanium cobalt green, cobalt green, cobalt blue, copper-chromium black, and copper-iron black; chromic pigments such as yellow lead and molybdate orange; and ferrocyanide pigments such as Prussian blue. The content of the dye-pigment is usually 5 mass parts or less, preferably 3 mass parts or less, more preferably 2 mass parts or less with respect to 100 mass parts of the total of the thermoplastic resin and the compound according to the present invention.

Examples of the flame retardant include: halogen flame retardants such as halogenated bisphenol A polycarbonate, brominated bisphenol epoxy resin, brominated bisphenol phenoxy resin, and brominated polystyrene; phosphate ester flame retardants; organometallic salt flame retardants such as dipotassium diphenylsulfone-3,3'-disulfonate, potassium diphenylsulfone-3-sulfonate, and potassium perfluorobutanesulfonate; and polyorganosiloxane flame retardants. Among them, phosphate ester flame retardants are preferable. The content of the flame retardant is usually 1 to 30 mass parts, preferably 3 to 25 mass parts, and more preferably 5 to 20 mass parts with respect to 100 mass parts of the total of the thermoplastic resin and the compound according to the present invention.

Various fillers may also be blended. The filler to be blended is not particularly limited as long as it is generally used for this type of resin composition, and powder-like, fibrous, granular and plate-like inorganic fillers may be preferably used as well as resin-based fillers or natural fillers.

The powdery or granular filler preferably has a particle size of 100 μm or less, more preferably 80 μm or less. Kaolinite, silica, carbonates such as calcium carbonate and magnesium carbonate, sulfates such as calcium sulfate and magnesium sulfate, alumina, glass beads, carbon black, sulfides and metal oxides may be used for the powdery or granular filler. Examples of the fibrous filler to be used are: glass fiber, potassium titanate or calcium sulfate whisker, wollastonite, carbon fiber, mineral fiber, and alumina fiber. Examples of the plate-like filler include: glass flake, mica, talc, clay, graphite, and sericite. Among these, at least one selected from glass fiber, carbon fiber, talc, mica, and wollastonite is preferable, and glass fiber and carbon fiber are particularly preferable.

Examples of the resin filler include aromatic liquid crystalline polyester resin, wholly aromatic polyamide resin, acrylic fiber, and poly(benzimidazole) fiber.

Examples of natural fillers include kenaf, pulp, hemp pulp, and wood pulp.

In the present invention, a filler may be used individually by 1 type and may be used in combination of 2 or more type.

The blending amount of the filler is preferably 10 to 200 mass parts, more preferably 30 to 180 mass parts, and still more preferably 50 to 150 mass parts with respect to 100 mass parts of the thermoplastic resin. When the content is 10 mass parts or more, the mechanical strength of the obtained molded body is improved. On the other hand, when it is 200 mass parts or less, the resin composition has good fluidity, and melt kneading and molding become easy.

Production method of resin composition and molded body

The resin composition of the present invention may be produced by, for example, mixing each of the above components using a mixer and then melt-kneading. As the mixer, a Banbury mixer, a roll mixer, or a Brabender mixer is used. For melt kneading, a single-screw kneading extruder, a twin-screw kneading extruder, or a kneader is used. Further, it is possible to employ a method in which each component is not mixed in advance, or only a part of the components is mixed in advance and fed to an extruder with a feeder and melt kneaded. In particular, the method of supplying the compound component having a polar group according to the present invention to the extruder with a feeder without mixing other components and melt-kneading is preferable in terms of extrusion workability.

The method for producing a molded body from the resin composition of the present invention is not particularly limited, and a molding method generally employed for thermoplastic resins may also be employed. Examples of the molding method include: general injection molding method, ultra-high speed injection molding method, injection compression molding method, two-color molding method, hollow molding method such as gas assist, molding method using heat insulating mold, molding method using rapid heating mold, foam molding (including supercritical fluid), insert molding, IMC (in-mold coating) molding method, extrusion molding method, sheet molding method, thermal molding method, rotational molding method, laminate molding method, and press molding method. A molding method using a hot runner method may also be adopted.

Among these, a producing method using a 3D printer is a preferred embodiment.

In the production method from the resin composition of the present invention to a molded body, examples of the molding method using a 3D printer include a fused deposition modeling (FDM method), an ink-jet method, an optical shaping method, a gypsum powder lamination method, and a laser sintering method (SLS method). Amon these, a fused deposition modeling is preferably used. Hereinafter, the case of the fused deposition modeling will be described as an example.

A 3D printer generally has a chamber, in which a heatable substrate, an extrusion head installed in a gantry structure, a heating melter, a guide for a resin composition (kneaded product), and a raw material supply unit such as a resin composition cartridge installation unit are provided. In some 3D printers, an extrusion head and a heating and melting device are integrated.

The extrusion head may be arbitrarily moved on the XY plane of the base by being installed in the gantry structure. The base is a platform for constructing the target 3D object and support material. It is preferable that the specifications are such that adhesion to the laminate may be obtained by heating and heat retention, or the resulting resin molded body may be used as a desired three-dimensional object to improve dimensional stability. Usually, at least one of the extrusion head and the base is movable in the Z-axis direction perpendicular to the XY plane.

The filament for 3D printer molding is drawn out from the raw material supply unit, sent to the extrusion head by a pair of opposed rollers or gears, heated and melted by the extrusion head, and extruded from the tip nozzle. For example, in response to a signal transmitted based on a CAD model, the extrusion head supplies the resin composition onto the substrate while moving its position, and deposits the layers. After this step is completed, the laminated deposit is taken out from the substrate, and the support material is peeled off as necessary, or the excess part is cut off to obtain a molded body as a desired three-dimensional object.

Examples of the means for continuously supplying the resin composition to the extrusion head are: a method of feeding and supplying the resin composition; a method of supplying powder or liquid from a tank via a quantitative feeder; and a method of extruding and supplying pellets or granules plasticized with an extruder. From the viewpoints of process simplicity and supply stability, the method of feeding and supplying the resin composition is most preferable.

When supplying a resin composition to a 3D printer, the resin composition is generally engaged with a driving roller such as a nip roller or a gear roller, and supplied to the extrusion head while being pulled. In order to stabilize the supply of raw materials by further strengthening the grip by engagement between the resin composition and the driving roller, it is also preferable to transfer a micro uneven shape on the surface of the resin composition, or to blend an inorganic additive, a spreading agent, an adhesive, or rubber for increasing the frictional resistance with the engaging portion.

In the resin composition of the present invention, the temperature for obtaining fluidity suitable for extrusion is usually about 190 to 240° C. It is a temperature that may be set by a general-purpose 3D printer. In the production method used in the present invention, the temperature of the heating extrusion head is usually set to be 230° C. or lower, preferably 200 to 220° C., and the base temperature is usually set to be 80° C. or lower, preferably 50 to 70° C., and the molded body may be stably produced.

The temperature of the molten resin composition discharged from the extrusion head (discharge temperature) is preferably 180° C. or higher, more preferably 190° C. or higher. On the other hand, it is preferably 250° C. or lower, more preferably 240° C. or lower, and still more preferably 230° C. or lower. When the temperature of the molten resin composition is equal to or higher than the above lower limit, it is preferable for extruding a resin having high heat resistance. Moreover, it is preferable also from the viewpoint of preventing deterioration of an external appearance of the molded body caused by the melted resin composition thinly extended (generally called stringing) and remained in a molded body. On the other hand, when the temperature of the molten resin composition is not more than the above upper limit, it is easy to prevent the occurrence of problems such as thermal decomposition and burning of the thermoplastic resin, smoke generation, odor, and stickiness. Moreover, it becomes possible to discharge at high speed, which is preferable because the molding efficiency tends to be improved.

The molten resin composition discharged from the extrusion head is preferably discharged in the form of a strand having a diameter of 0.01 to 1 mm, more preferably 0.02 to 0.5 mm. It is preferable that the molten resin composition is discharged in such a shape because, for example, the reproducibility of the CAD model tends to be good.

When manufacturing a molded body with a 3D printer using a resin composition for 3D printer molding, the following cases may occur. In this case, when making a molded body while laminating the strand-shaped resin composition discharged from the extrusion head, due to insufficient adhesiveness between the strand of the resin composition discharged first and the resin composition strand discharged thereon or uneven discharge, uneven portions (steps) are formed on the surface of the molded body. When there are irregularities on the surface of the molded body, not only the appearance deteriorates but also the molded body may be easily damaged.

The resin composition for molding a 3D printer according to the present invention is capable of stably producing a molded body having excellent appearance and surface properties with suppressed discharge unevenness during molding.

When making a molded body while laminating a strand-shaped resin composition ejected from an extrusion head by a 3D printer, there is a step of moving the nozzle to the laminating position of the next step after stopping the ejection of the resin. At this time, there may occur the case in which the resin is not interrupted and fine resin composition fibers are formed, which may remain on the surface of the molded body as if the yarn was pulled. When the above stringing occurs, problems such as deterioration of the appearance of the molded body may occur.

When making a molded body while laminating a strand-shaped resin composition discharged from an extrusion head by a 3D printer, it may adhere to the nozzle part of the extrusion head. Furthermore, the adhered resin composition may be colored by heat, resulting in black foreign matters (black spots or black stripes). And, such foreign matters are mixed in the molded body, which may cause problems such as not only deterioration of appearance but also damage of the molded product.

Since the resin composition of the present invention for molding with a 3D printer is excellent in heat resistance and is not easily colored by heat even if it adheres to the nozzle portion, it is possible to stably produce a molded body having an excellent appearance.

Moreover, in a preferable aspect of the present invention, a molded body may also be annealed on temperature conditions 40° C. or more and less than the glass transition temperature (Tg) of a resin composition. The annealing temperature is less than the Tg, preferably 60° C. or higher, more preferably 70° C. or higher. When the annealing temperature is 40° C. or higher, an effect of improving strength may be expected, and when it is Tg or lower, the resin does not melt, which is preferable. The treatment time is usually in the range of 5 min to 200 hr, preferably 1 to 100 hr, more preferably 2 to 48 hr. The method for the annealing treatment is not particularly limited, and a treatment method using far infrared rays may be employed in addition to the hot air dryer employed for the thermoplastic resin. During the annealing treatment, the molded body may be left still, may be flowed in a line, or the treatment temperature may be changed on the way.

Applications

The resin composition of the present invention is excellent in transparency, high rigidity, and heat resistance. The resin composition of the present invention having such features may be used in a wide range of fields as a molded body. It is useful for various applications. Examples of the application are: electrical/electronic equipment and parts, office automation equipment, information terminal equipment, machine parts, home appliances, vehicle components, medical equipment, building components, various containers, leisure goods and miscellaneous goods, and lighting equipment. In particular, application to electric/electronic devices, vehicle members, and medical instruments may be expected.

As housings, covers, keyboards, buttons, and switch members for electrical/electronic equipment, OA equipment, and information terminal equipment, it may be cited housings, covers, keyboards, buttons, and switch members for display devices such as personal computers, game machines, and televisions, printers, copiers, scanners, fax machines, electronic notebooks and PDAs, electronic desk calculators, electronic dictionaries, cameras, video cameras, mobile phones, recording media drives and reading devices, mice, numeric keys, CD players, MD players, portable radios, and portable audio player.

Examples of the vehicle member include a headlamp and a helmet shield. In addition, examples of the interior member include: inner door handle, center panel, instrument panel, console box, luggage floor board, and display housing for car navigation.

Examples of the medical instrument include application to a prosthetic hand and a prosthetic leg.

EXAMPLES

Hereinafter, the present invention will be specifically described by way of examples, but the present invention is not limited thereto. In addition, although the term "part" or "%" is used in an Example, unless otherwise indicated, it represents "mass part" or "mass %".

List of Materials Used in Examples

Thermoplastic Resin

PC: Polycarbonate manufactured by Mitsubishi Engineering-Plastic Corporation

Iupilon™ S-3000 (weight average molecular weight 45000, glass transition temperature 149° C.)

Iupilon™ H-4000 (weight average molecular weight 33000, glass transition temperature 146° C.)

PVC: Polyvinyl chloride Shin-Etsu PVC straight polymer TK1300 (average polymerization degree 1300, glass transition temperature 87° C.)

COP: Cycloolefin resin ARTON™ G7810 manufactured by JSR Corporation (weight average molecular weight 140000, glass transition temperature 168° C.)

PET: Polyethylene terephthalate MA-2101M manufactured by Unitika Ltd. (intrinsic viscosity=0.62 dl/g, glass transition temperature 70° C.)

CAP: Cellulose acetate propionate CAP482-20 manufactured by Eastman Chemical Japan Co., Ltd. (weight average molecular weight 220,000, glass transition temperature 138° C.)

Cellulose ester 1: Acetyl group substitution degree 1.63, propionyl group substitution degree 1.21, total acyl group substitution degree 2.84 (weight average molecular weight 230000, Glass transition temperature 145° C.)

In addition, the substitution degree of an acetyl group, a propionyl group, and a total acyl group was measured according to the method stipulated in ASTM-D817-96.

PP: Polypropylene MFX3 manufactured by Japan Polypropylene Corporation (weight average molecular weight 408000, glass transition temperature 0° C.)

Acrylic resin: BR85 manufactured by Mitsubishi Rayon Co., Ltd. (weight average molecular weight 280000, glass transition temperature 105° C.)

The weight average molecular weight was measured using gel permeation chromatography, and the glass transition temperature (Tg) was measured by differential scanning calorimetry (DSC) based on JIS K7121. Further, the intrinsic viscosity was measured based on the method described in paragraphs [0024] to [0026] of JP-A 2013-67749.

Additives

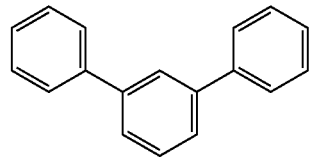

m-Terphenyl

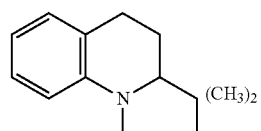

Compound 1

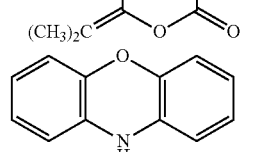

Phenoxazine

-continued

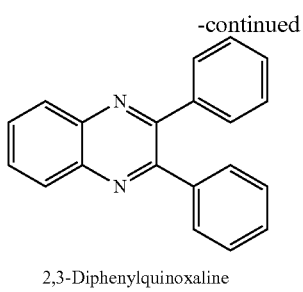

2,3-Diphenylquinoxaline

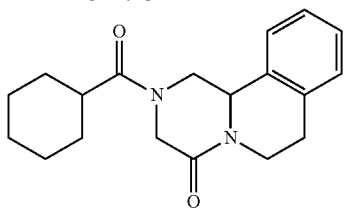

Praziquantel

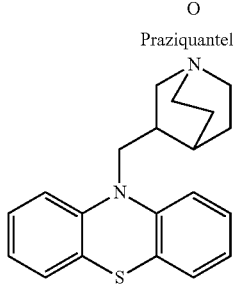

Mequitazine

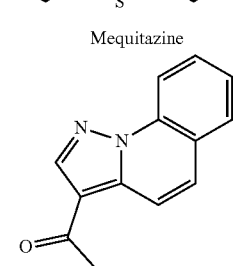

3-Acetylpyrazolo[1,5-a]quinoline

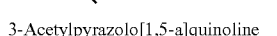

2-Nonylbenzoimidazole

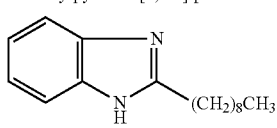

6-Acetyl-1,4-benzodioxane

Preparation of Resin Composition No. 1 and Film No. 1

A kneaded product of a resin composition No. 1 was prepared by the following method. And a film No. 1 was prepared using the resin composition No. 1 described in Table I by a melt casting film forming method.

A film was prepared according to a film formation flow indicated in FIG. 1 of WO 2000/00821.

First, the polycarbonate resin Iupilon™ S-3000 was formed into cylindrical pellets having an average diameter of 3 mm and an average length of 5 mm, and they were dried with a vacuum dryer at 110° C., so that the water content was 0.1% or less.

The formed pellets were melted at 260° C. using a twin-screw extruder having the configuration described in FIG. 1 of WO 2009/00821 to prepare a kneaded product. Subsequently, the molten resin sent out from the gear pump was filtered through a leaf disk filter having a filtration accuracy of 5 m.

Thereafter, the kneaded product was extruded from an extrusion die having a surface temperature of 260° C. indicated in FIG. 1 onto a first cooling roll at 180° C. so that the polycarbonate resin was in contact with the first cooling roll. The amount of resin supplied was adjusted so as to form the polycarbonate resin layer of 100 m as the film thickness after film formation. At this time, the film was pressed on the first cooling roll with an elastic touch roll having a 2 mm thick metal surface at a linear pressure of 10 kg/cm.

Subsequently, it was conveyed so that the surface temperature of a second cooling roll became 95° C.

The first cooling roll and the second cooling roll were made of stainless steel having a diameter of 40 cm, and the surface was hard chrome plated. In addition, temperature adjusting oil (cooling fluid) was circulated inside to control the roll surface temperature. The elastic touch roll had a diameter of 20 cm, the inner cylinder and the outer cylinder were made of stainless steel, and the surface of the outer cylinder was hard chrome plated. The wall thickness of the outer cylinder was 2 mm, and oil for cooling (cooling fluid) was circulated in the space between the inner cylinder and the outer cylinder to control the surface temperature of the elastic touch roll.

According to the above preparation conditions, a film No. 1 having a film thickness of 100 μm was obtained.

Preparation of Resin Composition No. 2 and Film No. 2

A resin composition No. 2 was prepared in the same manner as in the preparation of the resin composition No. 1, except that the polycarbonate resin Iupilon™ H-4000 was used instead of the polycarbonate resin Iupilon™ S-3000. A film No. 2 was obtained by using the resin composition No. 2.

Preparation of Resin Composition No. 3 and Film No. 3

A resin composition No. 3 was prepared in the same manner as in the preparation of the resin composition No. 1, except that m-terphenyl (manufactured by Nippon Steel Chemical Co., Ltd.) was added to the thermoplastic resin as an additive in an amount of 20 mass %. A film No. 3 was obtained by using the resin composition No. 3.

Preparation of Resin Composition No. 4 and Film No. 4

A resin composition No. 4 was prepared in the same manner as in the preparation of the resin composition No. 1, except that Compound 1 was added to the thermoplastic resin as an additive in an amount of 20 mass %. A film No. 4 was obtained by using the resin composition No. 4.

Preparation of Resin Composition No. 5 and Film No. 5

A resin composition No. 5 was prepared in the same manner as in the preparation of the resin composition No. 1, except that phenoxazine (compound having a polar group at the para position) was added to the thermoplastic resin as an additive in an amount of 20 mass %. A film No. 5 was obtained by using the resin composition No. 5.

Preparation of Resin Compositions No. 6 to No. 20 and Films No. 6 to No. 20

Resin compositions No. 6 to No. 20 were prepared in the same manner as in the preparation of the resin composition No. 1, except that a thermoplastic resin and an additive as described in Table I were used. Films No. 6 to No. 20 were obtained by using the resin compositions No. 6 to No. 20.

Evaluation

The following evaluation was performed using the obtained films No. 1 to No. 20.

(1) 3D Printer Aptitude

A film cut into 5 cm square was placed on a hot plate heated to 150° C., and the shape of the film was observed.

When there was a change in the film shape, it was evaluated as ○, and when there was no change, it was evaluated as x When there is a change in the film shape in the above evaluation, there is an aptitude for the FDM (Fused deposition modeling) method in general-purpose 3D printer.

(2) Strength (Tensile Elastic Modulus)

The optical film was cut into a size of 100 mm (MD direction)×10 mm (TD direction) to obtain a test piece.

In accordance with JIS K7127, the test piece was pulled in the MD direction (direction X) of the test piece by using Tensilon RTC-1225A manufactured by Orientec Co., Ltd. Tensile elastic modulus was measured. The measurement was performed at 25° C. and 55% RH. The unit is GPa. The tensile elastic modulus is preferably 2.40 or more, and more preferably 2.60 or more.

(3) Heat Resistance (Gas Generation During Molding)

Using a differential thermal thermogravimetric simultaneous measurement device (TG/DTA), a 50 mg sample was set in the sample pan, and weight loss when heated at 300° C. was confirmed. As a measuring device, STA7200RV manufactured by Hitachi High-Tech Science Co., Ltd. was used. The unit is mass %, and the smaller the value, the smaller the thermal decomposition and the less gas generation during molding. The weight reduction rate (mass %) is preferably less than 85, more preferably 50 or less, and even more preferably 30 or less.

The above resin composition configuration and evaluation results are summarized in Table I.

TABLE I

| Resin composition No. | Thermoplastic resin | | Heterocyclic compound | | | |
|---|---|---|---|---|---|---|
| | Thermoplastic resin | Product name | Name of Heterocyclic compound | Position of Polar group | Molecular weight | Added amount (mass %) |
| 1 | PC | Iupilon S - 3000 | None | — | — | — |
| 2 | PC | Iupilon H - 4000 | None | — | — | — |
| 3 | PC | Iupilon S - 3000 | m-Terphenyl | None | 230 | 20 |
| 4 | PC | Iupilon S - 3000 | Compound 1 | Meta position | 269 | 20 |
| 5 | PC | Iupilon S - 3000 | Phenoxazine | Para position | 183 | 20 |
| 6 | PC | Iupilon S - 3000 | 2,3-Diphenylquinoxaline | Para position | 282 | 20 |
| 7 | PC | Iupilon S - 3000 | Praziquantel | Para position | 312 | 20 |
| 8 | PC | Iupilon S - 3000 | Mequitazine | Para position | 322 | 20 |
| 9 | ARTON | ARTON | Praziquantel | Para position | 312 | 20 |
| 10 | PET | MA - 2101M | Praziquantel | Para position | 312 | 20 |
| 11 | CAP | 482 - 20 | Praziquantel | Para position | 312 | 20 |
| 12 | PP | MFX - 3 | Phenoxazine | Para position | 183 | 20 |
| 13 | PC | Iupilon S - 3000 | 3-Acetylpyrazolo[1.5-a]quinoline | Ortho position | 210 | 20 |
| 14 | PC | Iupilon S - 3000 | Praziquantel | Para position | 312 | 10 |
| 15 | PC | Iupilon S - 3000 | Praziquantel | Para position | 312 | 30 |
| 16 | PC | Iupilon S - 3000 | 2-Nonylbenzoimidazole | Meta position | 244 | 20 |
| 17 | CAP | Cellulose ester 1 | Praziquantel | Para position | 312 | 20 |
| 18 | PC | Iupilon S - 3000 | 6-Acetyl-1,4-benzodioxane | Para position | 183 | 20 |
| 19 | PVC | TK1300 | Praziquantel | Para position | 312 | 20 |
| 20 | Acrylic resin | BR85 | Praziquantel | Para position | 312 | 20 |

| Resin composition No. | Evaluation | | | | |
|---|---|---|---|---|---|
| | Shape of film on a hot plate | *1 | *2 | Tg (° C.) | Remarks |
| 1 | X | 2.29 | 0 | 149 | Comparative example |
| 2 | X | 2.00 | 0 | 146 | Comparative example |
| 3 | ○ | 2.35 | 85 | 129 | Comparative example |
| 4 | ○ | 2.30 | 31 | 129 | Inventive example |
| 5 | ○ | 2.40 | 78 | 129 | Inventive example |
| 6 | ○ | 2.83 | 14 | 129 | Inventive example |
| 7 | ○ | 2.88 | 0 | 129 | Inventive example |
| 8 | ○ | 2.79 | 6 | 129 | Inventive example |
| 9 | ○ | 2.80 | 0 | 168 | Inventive example |
| 10 | ○ | 4.60 | 0 | 50 | Inventive example |
| 11 | ○ | 2.50 | 0 | 120 | Inventive example |
| 12 | ○ | 1.60 | 85 | −5 | Comparative example |

TABLE I-continued

| | | | | | |
|---|---|---|---|---|---|
| 13 | ○ | 2.40 | 68 | 129 | Inventive example |
| 14 | ○ | 2.60 | 0 | 140 | Inventive example |
| 15 | ○ | 3.00 | 8 | 110 | Inventive example |
| 16 | ○ | 2.34 | 46 | 129 | Inventive example |
| 17 | ○ | 2.60 | 4 | 125 | Inventive example |
| 18 | ○ | 2.50 | 80 | 129 | Inventive example |
| 19 | ○ | 2.80 | 4 | 67 | Inventive example |
| 20 | ○ | 3.40 | 4 | 90 | Inventive example |

*1: Tensile elastic modulus (GPa)
*2: Heat resistance (TG/DTA) (mass %)

It was found the following from Table I. By using a resin composition containing: a thermoplastic resin having a polar group according to the present invention; and a heterocyclic compound having a plurality of heteroatoms, provided that the heterocyclic compound is a condensed ring compound having two or more rings, and that one of a nitrogen atom (N), an oxygen atom (O) and a sulfur atom (S) is contained at para positions to each other in a skeleton of at least one ring, it is possible to obtain resin composition that has an aptitude for general-purpose 3D printers, generates less gas during thermal molding, and excellent in at least strength or heat resistance when formed into a molded body.

Specifically, among the resin compositions containing a heterocyclic compound, the resin composition in which the thermoplastic resin does not have a polar group (for example, the resin composition No. 12) or the resin composition in which the heterocyclic compound does not have two or more heteroatoms (for example, the resin composition No. 3) has a low tensile strength. On the other hand, the resin composition containing a heterocyclic compound having two or more heteroatoms has improved tensile strength. Among the resin compositions in which the heterocyclic compound has two or more heteroatoms, those having heteroatoms located at meta positions to each other in one ring skeleton and having a molecular weight of more than 183 have a higher tensile strength and less weight loss. These are particularly preferable since they are excellent in both tensile strength and heat resistance.

Although the embodiments of the present invention have been described in detail, the disclosed embodiments are made for purpose of indicating examples only and not limitation. The scope of the present invention should be interpreted by terms of the appended claims.

What is claimed is:

1. A resin composition comprising:
a thermoplastic resin having a polar group; and
a heterocyclic compound is a condensed ring compound having two or more rings, and one of a nitrogen atom (N), an oxygen atom (O) and a sulfur atom (S) is contained at para positions to each other in a skeleton of at least one ring,
wherein the resin composition exhibits a different behavior in elastic strength with a glass transition temperature as a boundary.

2. A resin composition comprising:
a thermoplastic resin having a polar group that is a halogen atom, a carboxy group, a hydroxy group, an alkoxy group, an alkoxycarbonyl group, an aryloxycarbonyl group, an amino group, an amide group, or a cyano group;
a heterocyclic compound containing two or more heteroatoms,
wherein the resin composition exhibits a different behavior in elastic strength with a glass transition temperature as a boundary.

3. A resin composition comprising:
a thermoplastic resin having a polar group; and
a heterocyclic compound containing a quinoxaline structure, a praziquantel structure, or a mequitazine structure;
wherein the resin composition exhibits a different behavior in elastic strength with a glass transition temperature as a boundary.

4. A resin composition comprising:
a thermoplastic resin having a polar group; and
a heterocyclic compound containing two or more heteroatoms and a molecular weight that exceeds 183;
wherein the resin composition exhibits a different behavior in elastic strength with a glass transition temperature as a boundary.

5. The resin composition of claim 1, wherein the thermoplastic resin contains an aromatic polycarbonate, a cycloolefin, a polyester, a cellulose ester or an acrylic resin.

6. A resin composition comprising:
a thermoplastic resin having a polar group; and
a heterocyclic compound containing two or more heteroatoms in an amount in the range of 1 to 20 mass % with respect to the thermoplastic resin;
wherein the resin composition exhibits a different behavior in elastic strength with a glass transition temperature as a boundary.

7. A molded body produced by using the resin composition of claim 1.

8. The resin composition of claim 2, wherein the thermoplastic resin contains an aromatic polycarbonate, a cycloolefin, a polyester, a cellulose ester or an acrylic resin.

9. The resin composition of claim 3, wherein the thermoplastic resin contains an aromatic polycarbonate, a cycloolefin, a polyester, a cellulose ester or an acrylic resin.

10. The resin composition of claim 4, wherein the thermoplastic resin contains an aromatic polycarbonate, a cycloolefin, a polyester, a cellulose ester or an acrylic resin.

11. The resin composition of claim 5, wherein the thermoplastic resin contains an aromatic polycarbonate, a cycloolefin, a polyester, a cellulose ester or an acrylic resin.

12. A molded body comprising the resin composition of claim 1.

13. A molded body comprising the resin composition of claim 2.

14. A molded body comprising the resin composition of claim 3.

15. A molded body comprising the resin composition of claim 4.

16. A molded body comprising the resin composition of claim 6.

* * * * *